Patented Oct. 16, 1934

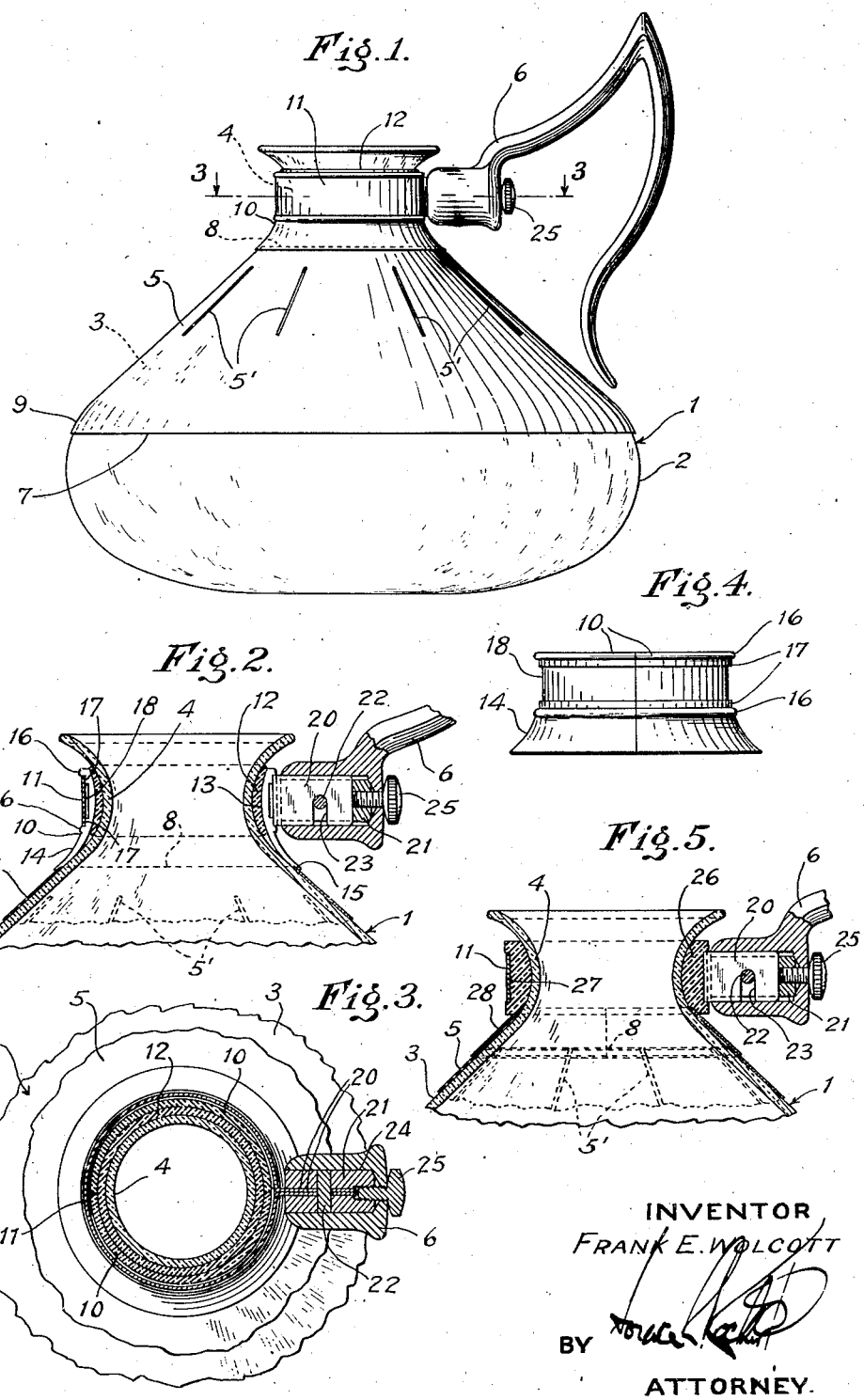

1,977,367

UNITED STATES PATENT OFFICE 1,977,367

POURING BOWL

Frank E. Wolcott, West Hartford, Conn., assignor to The Silex Company, a corporation of Connecticut Application January 26, 1932, Serial No. 588,942

22 Claims. (Cl. 53—3)

My invention relates to pouring bowls.

It has among its objects to provide an improved pouring bowl assembly for coffee makers or the like, and more particularly, an improved assembly particularly adapted to use with glass bowls and of the type including a bowl shield and a handle carried upon the bowl. A further object of my invention is to provide such an improved assembly having improved and simplified shield means and improved and simplified connections between the shield and handle including improved handle insulating and shield positioning means, all whereby the construction is simplified at the same time that the same is rendered more convenient in use and attractive in appearance and also adapted to be manufactured at reduced expense. A still further object of my invention is to provide improved bowl shielding means and improved handle insulating and bowl shield positioning means adapted to be applied with a minimum of expense to coffee makers or the like having a standard form of bowl and handle and which have been previously sold. These and other objects and advantages of my improved construction will, however, hereinafter more fully appear.

In the accompanying drawing I have shown for purposes of illustration two embodiments which my invention may assume in practice.

In the drawing,—

Figure 1 is a side elevation of a pouring bowl of a coffee maker equipped with my improvement;

Fig. 2 is a partial vertical sectional view of the upper portion of the same, the section being taken along the center line of the handle portion;

Fig. 3 is a transverse section on line 3—3 of Fig. 1;

Fig. 4 is a side elevation of the insulating members removed from the bowl, and

Fig. 5 is a view similar to Fig. 2, but showing a modified construction.

In the illustrative construction shown in Fig. 1, it will be noted that I have shown a lower bowl 1 of a well known glass form having an enlarged curved base 2 connected by a conical or sloping upper portion 3 with a reduced curved neck 4 and carrying on the portion 3 an improved shield 5, while a handle 6 is disposed around the neck 4 and operatively associated with and insulated from the shield, all as hereinafter more fully described.

Referring more particularly to the shield 5, it will be noted that the same herein is of the general form of a hollow truncated cone which is adapted to fit on and form a shield for the portion 3 of the bowl. As shown, its open lower end 7 is disposed slightly above the point of maximum width of the bowl base 2, while its upper open end 8 is disposed adjacent but below the curved neck 4 of the bowl, while the portion of the member 5 intermediate its ends rests on the surface 3 of the bowl. It will also be noted that this member 5 is herein of one piece construction and that the same is tapered substantially uniformly from top to bottom, save for a slightly incurved portion 9 on its lower end which is adapted to make the latter merge into the curvature of the portion 2 of the bowl in an effective manner. It will also be noted that herein the upper edge 8 of the shield is unslotted, while radial slots 5' are provided in the portion 5 below the edge 8, although it will be evident that, if desired, in certain constructions these slots may be extended clear through the edge 8 and that in others, the slots may be altogether omitted. Thus it will be observed that the member 5 not only provides an effective shield for the bowl, but that the shield is of a construction which enables the same to be manufactured at small expense of any suitable material, preferably metal.

Operatively associated with this shield 5 are improved positioning means therefor which herein are in turn adapted to be held in position by the handle 6. Herein, these means include a plurality of divided and separable complementary insulating members, herein a pair of vertically split members 10. These members 10 are adapted to engage the upper edge 8 of the shield 5 and to be disposed around the neck 4 of the bowl, while being grasped and held together by the resilient metal band 11 which forms a part of the handle 6. More particularly, it will be noted that these members 10 herein engage with a relatively thin soft rubber washer 12 carried on the outside of the neck 4 in such manner as to insulate the members 10 from the neck, and, at the same time, enable the members 10 to have a firm grip on the bowl when these members are pressed together by the band 11, as hereinafter described. To this latter end, it will also be noted that these members 10 are provided with a convex inner surface 13 adapted to be pressed into the washer 12 as illustrated in Fig. 2. Herein, the members 10 are also, as preferably, provided with depending integral extensions 14 which extend below the lower end of the washer 12 in spaced relation thereto and to the glass adjacent the washer 12. Herein, the lower ends of these members 14, however, come into adjacency to the glass of the portion 3 of the bowl below the neck 4. As shown, the same are also provided with a flange 15 overlying the upper edge 8 of the shield 5 in such manner as to force the same downward on the portion 3 of the bowl and thus hold the portion 5 in position when the members 10 are clamped together around the neck washer 12. Thus it will be observed that the members 10 provide effectual insulating means and at the same time act as positioning means for the handle band and the shield 5.

In order that these members 10 may co-operate effectually with the handle band 11 and transmit a minimum amount of heat to the latter, it will be noted that the upper portion of each member 10 is provided with a pair of spaced outwardly projecting means, herein in the form of annular flanges 16, one at the top of the same and the other just above the portion 14. Adjacent each flange and between the same are also reduced portions 17, while between these portions 17 is a further reduced portion 18 of substantially greater width than the portions 17 and forming the latter into spaced annular seats. Thus it is possible for the spring band 11 of the handle 6 to be clasped around the members 10 in the position illustrated in Fig. 2, i. e. with its upper and lower edges engaging the annular flanges 16 and adjacent portions resting upon the reduced portions 17, while the intermediate portion of the band is spaced from the body of the members 10 by an annular air space provided by the reduced portion 18. Thus, a very effective means is provided for minimizing transmission of heat from the bowl to the handle 6.

As regards the connecting means between the band 11 and handle 6, it will be understood that, although I have illustrated releasable connecting means of a well known type, my invention is in no way limited to use in connection with a particular form of connecting means. In view of this and the fact that the particular connecting means per se does not form a part of the present invention, it is believed sufficient to state that the same, as shown herein, comprise extensions 20 on the ends of the spring band 11 receivable in a slotted holding member 21 which has a transverse pin 22 adapted to be received in notches 23 in the extensions 20, in turn, while the member 21 is adapted to be received in a corresponding socket portion 24 in the handle and attached thereto by a screw 25, i. e. a construction which is readily connectable or removable at will to clamp or release the members 10.

In the use of my improved construction it will be evident that the parts may be very readily and quickly assembled by merely dropping the shield 5 on the portion 3 of the bowl and placing the members 10 together around the member 12 and in engagement with the upper edge 8 of the shield 5, i. e. in the position illustrated in Figures 1 and 2, and then connecting the band 11 in such manner as to clamp these members 10 together. When the parts are so connected, it will also be evident that a unitary construction is provided wherein the band 11 holds the parts 10 in the desired position and is effectually insulated thereby, while the members 10 also co-operate with the member 12 and shield 5 to hold the band 11 and the shield in position on the bowl. When for any reason it is desired to remove the parts, the same, of course, may be readily removed by simply removing the handle 6 and then the band 11, whereupon the parts 10 may drop apart and the shield 5 may be lifted off the bowl.

As a result of my improvement, it will be noted that it is possible to use a shield 5 of exceedingly simple and inexpensive construction, all need for upwardly extending prongs or fingers grasped by the handle band, being eliminated. It is also made possible to use with the new and simplified shield, an exceedingly simple and convenient insulating means which enables the parts to be very readily connected or disconnected when desired and have only a minimum of equipment on the bowl, the members 10 being readily separable and the member 12 being the only member remaining on the bowl. Moreover, it will be noted that it is made possible to use insulating members 10 of a type which may be inexpensively made of bakelite or other insulating material, in not only a simple and attractive form, but in different colors adapted to contrast effectively with the metal and glass parts of the device. It will of course also be evident that at the same time that these members 10 are used, it is still possible to provide on the member 5 sufficient free space for decoration in case the same is desired. These and other advantages of this form of my improved construction will, however, be apparent to those skilled in the art.

In Fig. 5 I have illustrated a modified construction which, while generally similar to the preferred construction heretofore described, differs therefrom in certain respects and may be used under certain conditions if desired. In this construction the slots 5' in the member 5 extend clear through the upper edge 8 of the same. It will also be noted that instead of the small washer 12 and the two members 10, I provide three other members. One of these is in the form of a thicker soft rubber washer 26 directly grasping the neck of the bowl and provided with an external groove 27 adapted to receive the spring band 11 of the handle. The others are in the form of vertically split insulating members 28 which correspond in general to the extensions 14 on the members 10 but are separate from the washer 26 and have their upper ends extended in under the lower soft rubber edge of the same in such manner as to be held in position thereby. Also, the lower ends of the members 28 herein rest and press on the upper edge of the member 5 in such manner that the portions of the members 28 below their upper ends are spaced slightly from the glass and the member 5 is held against movement. In this construction, it will be evident that the handle band 11 may be removed and the split members 28 released from the washer 26, whereupon the member 5 may be lifted off from the bowl while leaving the soft rubber washer 26 in place on the neck.

While I have in this application specifically described two forms which my invention may assume in practice, it will be understood that these forms are used for illustrative purposes, and that the invention may be modified and embodied in various other forms without departing from its spirit or the scope of the appended claims.

What I claim as new and desire to secure by Letters Patent is:—

1. In combination, a receptacle having a neck, a shield on said receptacle having its upper end terminating below said neck, and means on said neck for positioning said shield.

2. In combination, a receptacle shield adapted to cover a body portion of a receptacle while exposing the neck portion thereof, and laterally separable positioning means having means engageable with said shield for positioning said shield upon a receptacle.

3. In combination, a bowl having a neck, a shield on said bowl having its upper end terminating below said neck, a handle on said neck, and means between said handle and shield for insulating said handle and positioning said shield.

4. In combination, a bowl having a neck, a shield on said bowl having its upper end terminating below said neck, a handle on said neck, and means between said handle and shield for insulating said handle and positioning said shield including a plurality of separable members engaging said shield.

5. In combination, a bowl having a neck, a shield on said bowl having its upper end terminating below said neck, insulating means on said neck having means for locating said shield, and handle carrying means on said insulating means.

6. In combination, a bowl having a neck, a shield on said bowl having its upper edge terminating below said neck, insulating means surrounding said neck and having depending portions engaging said shield, and handle carrying means on said insulating means above said depending portions.

7. In combination, a bowl having a neck, a shield on said bowl having its upper end terminating below said neck, separable insulating members on said neck above said shield positioning the latter, and means for holding said members together on said neck.

8. In combination, a bowl having a neck, a shield on said bowl having its upper end terminating below said neck, a compressible band on said neck, separable insulating members on said neck above said shield positioning the latter and engaging said band, and means for holding said members together on said neck.

9. In combination, a bowl having a neck, a shield on said bowl having its upper end terminating below said neck, laterally separable insulating members on said neck above said shield engaging the latter and having an external handle positioning portion, and a handle having a clamping band grasping said portion.

10. In combination, a bowl having a neck, a shield on said bowl, separable members having portions above said shield adapted to be held together and depending portions engaging said shield, and means on said first mentioned portions for holding said members together.

11. In combination, a shield having an enlarged aperture in its upper end disposable over a bowl neck and below the same on the bowl, and means for positioning the same on a bowl having laterally separable members disposed over said aperture and means for holding said members together.

12. In combination, a shield having an enlarged aperture in its upper end disposable over a bowl neck and below the same on the bowl, insulating means disposable around a bowl neck above said shield engageable with the latter, and a handle having a portion grasping said insulating means.

13. In combination, a shield having an enlarged aperture in its upper end disposable over a bowl neck and below the same on the bowl, separable insulating means forming a continuation of said shield and disposable around a bowl neck above said shield, and a handle having a portion grasping said insulating means.

14. In combination, a rigid annular shield having an enlarged aperture in its upper end disposable over a bowl neck and below the same on the bowl, separable insulating means forming a continuation of said shield and disposable around a bowl neck above said shield, a compressible member positioning said separable means, and a handle having a portion grasping said compressible member.

15. In combination, a bowl having a neck, a shield disposable on said bowl below said neck having an opening in its upper end larger than said neck, separable insulating members above said shield and enclosing said neck, and a handle having a band engaging said separable members and holding the same together on said neck.

16. In combination, a bowl having a neck, a rigid shield having an enlarged aperture in its upper end disposable over the bowl neck and below the same on the bowl, compressible means on said neck, vertically divided insulating members engaging said compressible means and having depending portions engageable with the upper end of said shield, and a handle having a portion holding said members together and compressing the same on said compressible means.

17. In combination, a bowl having a neck, a rigid shield having an enlarged aperture in its upper end disposable over the bowl neck and below the same on the bowl, compressible means on said neck, vertically divided insulating members engaging said compressible means and positioned thereby and having depending portions engageable with the upper end of said shield, and a handle having a portion engaging said compressible means on said neck above said insulating members.

18. In combination, a plurality of vertically divided insulating members co-operating to form a neck enclosing means and having on their upper ends means for receiving and positioning a clamping member and on their lower ends depending portions of increased diameter.

19. In combination, a plurality of vertically divided insulating members co-operating to form a neck enclosing means and having convex portions inside their upper ends and grooved portions on the outside of their upper ends presenting spaced handle band engaging supports.

20. In combination, a plurality of vertically divided insulating members co-operating to form a neck enclosing means and having convex portions inside their upper ends and grooved portions on the outside of their upper ends presenting spaced handle band engaging supports, and also depending portions of increased diameter on their lower ends and bowl positioning flanges on the lower extremities of said portions.

21. In combination, a coffee maker lower bowl having a neck portion and a body portion, insulating means surrounding said neck portion, independent enclosing means comprising a plurality of co-operating members removably disposed around said insulating means, and handle carrying means encircling said enclosing means and removable independently thereof.

22. In combination, a coffee maker lower bowl having a neck portion and a body portion, insulating means surrounding said neck portion, independent enclosing means comprising a plurality of co-operating members having depending means overlying the body portion of the bowl and removably disposed around said insulating means, and handle carrying means encircling said enclosing means and removable independently thereof.

FRANK E. WOLCOTT.